H. DE W. RIDGE.
SCALE.
APPLICATION FILED SEPT. 27, 1915.
1,427,760.
Patented Aug. 29, 1922.
3 SHEETS—SHEET 3.
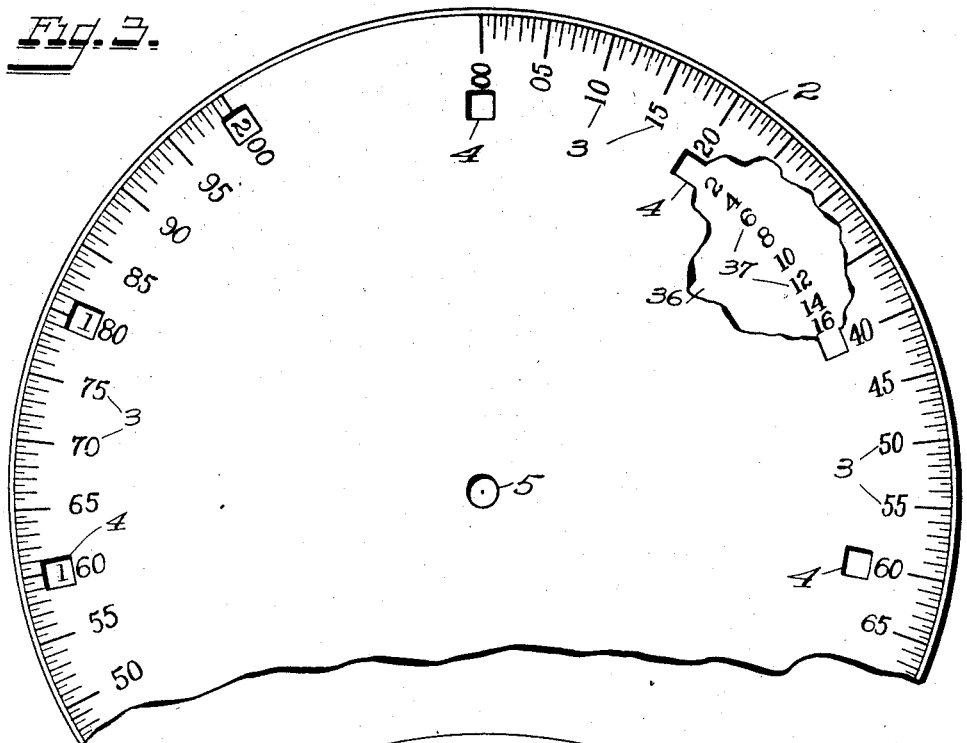
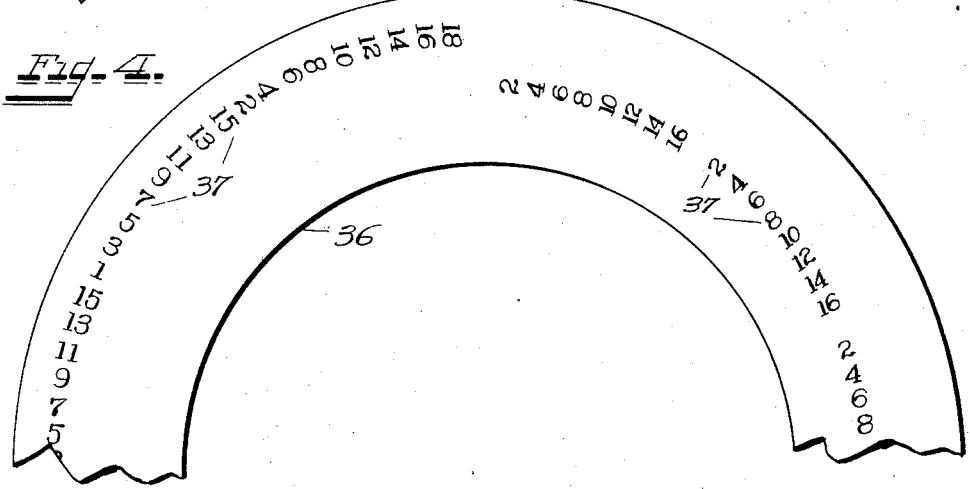
Inventor.
Herman DeWitt Ridge
Atty.

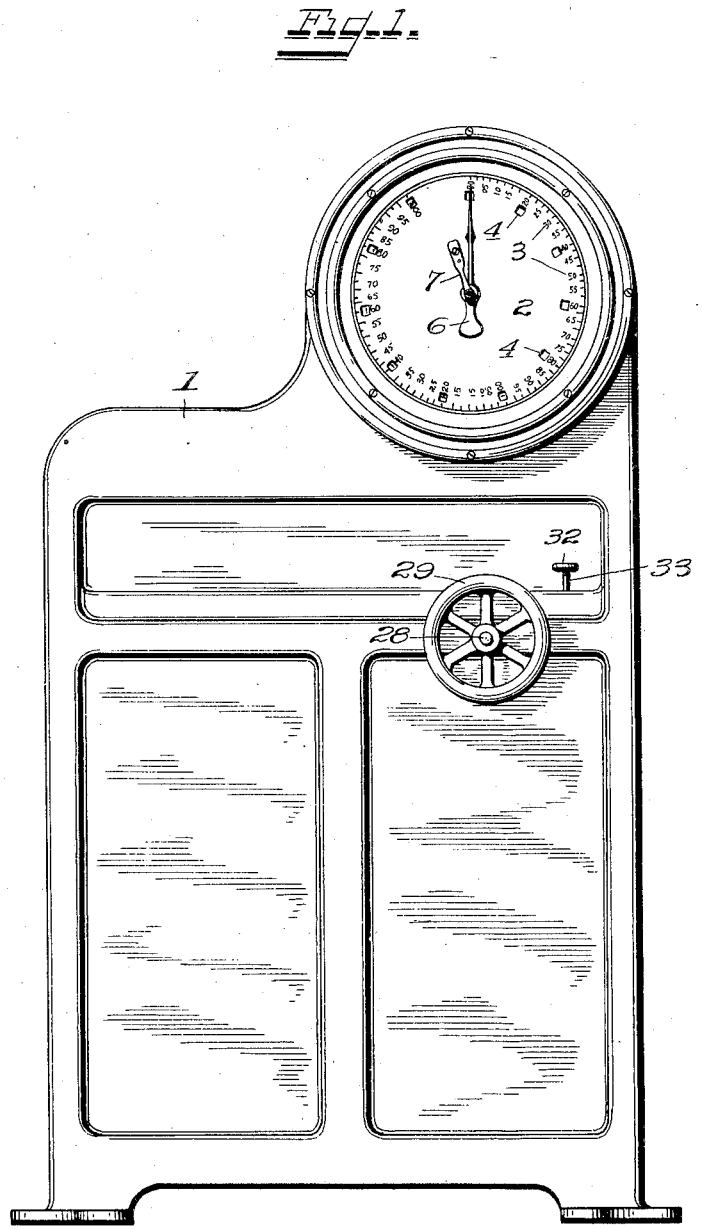

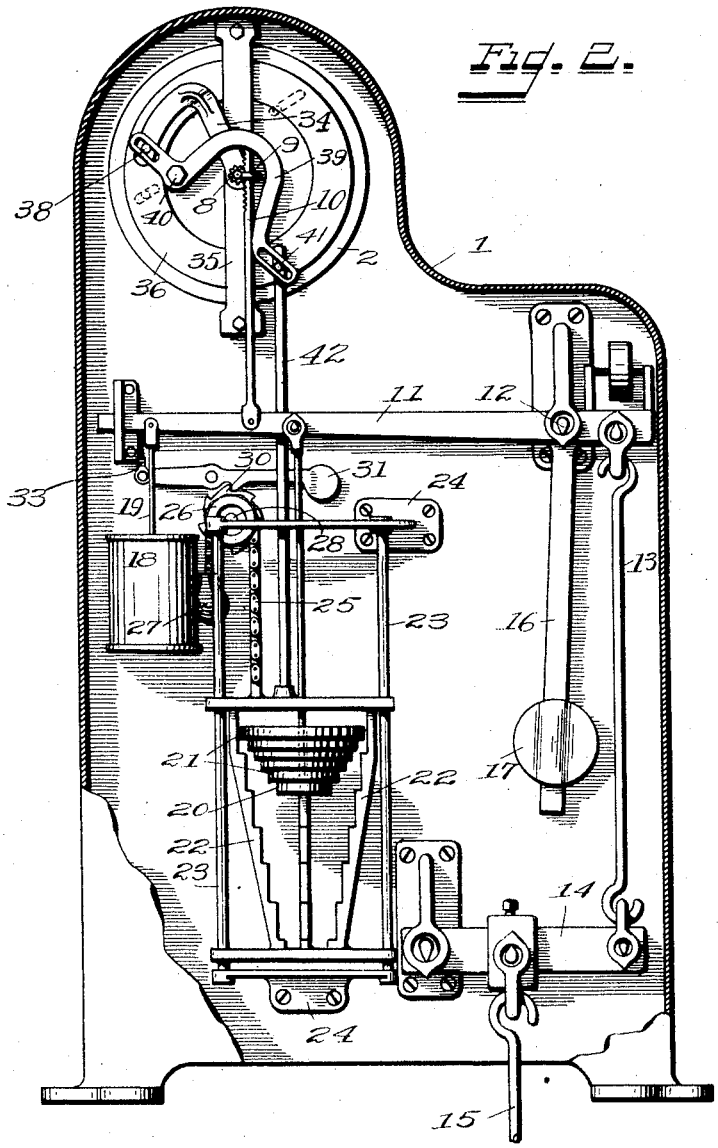

UNITED STATES PATENT OFFICE.

HERMAN DE WITT RIDGE, OF CHICAGO, ILLINOIS.

SCALE.

1,427,760.	Specification of Letters Patent.	Patented Aug. 29, 1922.

Application filed September 27, 1915. Serial No. 52,770.

*To all whom it may concern:*

Be it known that I, HERMAN DE WITT RIDGE, a citizen of the United States, and a resident of Chicago, in the county of Cook and State of Illinois, have invented certain new and useful Improvements in Scales, of which the following is a full, clear, and exact description, reference being had to the accompanying drawings, forming part of this specification.

My invention relates primarily to that class of scales in which a pointer or indicator is employed in conjunction with a graduated dial by means of which the weight on the scale may be properly indicated and easily and correctly read, and more particularly to a sub-class of such scales wherein, when the weight on the scale exceeds the limit of the graduations, the index of said graduations may be changed to read to a higher or greater weight.

The object of my invention is to provide a simple and effective mechanism for changing the index of the graduations mentioned.

The novelty of my invention will be hereinafter more fully set forth and specifically pointed out in the claims.

In the drawings: Figure 1 Sheet 1, is a front elevation of that part of a scale mechanism which embodies my invention.

Figure 2 Sheet 2, is a rear view of the same, partly in section to show the interior arrangement of the parts.

Figure 3 Sheet 3, is an enlarged view, partly broken away, of the main dial, and showing part of the index dial behind the same.

Figure 4 Sheet 3, is a corresponding view of the index dial.

The same numerals of reference are used to indicate identical parts in all the figures.

My invention does not contemplate the employment of any particular form or construction of platform upon which the material to be weighed is placed, but only concerns itself with the principle of and mechanism for changing the range of reading of the dial and to that end and as shown in the various figures, any suitable dial frame 1 may be employed, having thereon the main dial 2 which is provided on its face with the characters 3 and apertures 4.

The characters 3 as shown, indicate pounds of weight and are subdivided as shown in Figs. 3 and 4 into half pounds though of course it will be apparent that any other subdivisions or form of character may be employed without departing from the spirit of my invention.

The main dial 2 is provided with a central aperture 5, as shown in Fig. 3, and through this aperture, the shaft of the pointer or indicator 6 extends to and is journalled in the bracket 7 as shown in Fig. 1, after the usual form of construction.

The rear end of the shaft of the pointer 6 is provided with the usual pinion 8 and is journalled in the usual bracket as shown in Fig. 2.

A rack 10, suitably guided in the bracket 9, engages the pinion 8 to rotate the same and with it the pointer 6, and this rack is connected to the scale beam 11, which beam is mounted on the knife edges 12 and operated by the weight on the scale platform through the usual linkage 13 and compound lever 14 which in turn is operated through the linkage 15 which is operated by the scale platform, these later described parts being shown more clearly in Fig. 2.

The scale beam 11 is provided with the pendulum arm 16 and weight 17 which hang substantially under the fulcrum 12.

In order that the scale beam 11 may come to rest promptly after a load has been placed on the scale platform, a dash-pot 18 of any suitable construction is secured to the frame 1 and the piston of this dash-pot is connected, through rod 19, to the scale beam 11 near its free end.

Scales of this character are usually provided with means for counterbalancing the beam so that weights or loads heavier than those indicated by the dial may be weighed, and I have shown for this purpose, a poise 20 connected to the scale beam and suspended therefrom, and a series of poise weights 21 which may be of increasing diameter as shown, or may be arranged in any other suitable manner for the purpose.

The poise weights 21 are arranged to be deposited on the poise one after another until a balance is reached and to this end I have shown a weight cage 22 composed of a series of stepped bars and a top and bottom plate having guide rod openings, this cage sliding on guide rods 23 secured to brackets 24 which in turn are secured to the frame 1.

It is to be borne in mind that while the size or shape of the poise weights may vary, the weight of each is equal to the others.

As a convenient method of actuating the weight cage 22 and thereby depositing the poise weights successively onto the poise, I have shown a sprocket chain 25 attached at one end to the weight cage and passing over a shrouded sprocket 26 and having its other end attached to a counter-weight 27.

The sprocket 26 is mounted on a shaft 28 which is suitably journalled in the frame 1, passes to the outside thereof and carries the hand wheel 29 shown in Fig. 1.

Mounted adjacent to the sprocket 26, Fig. 2, and on the shaft 28, is a ratchet 30, having its teeth spaced apart a distance in proportion to the space between any two of the steps on the bars of the weight cage 22, and this ratchet lies in the plane of a pivoted pawl 31, which is counterweighted in such manner that it is normally in engagement with the ratchet to prevent the lowering of the weight cage. A push button 32, Fig. 1, on a rod 33, Figs. 1 and 2, is provided and located near the hand-wheel 29, as shown, and the rod 33 is connected to the pawl 31, in such manner that when the push button 32 is depressed the pawl is disengaged from the ratchet and permits the sprocket 26 to be rotated and the weight cage to descend, thereby depositing the poise weights on the poise, as will be readily understood.

The weight cage is raised and the poise weights removed from the poise by operating the hand-wheel in the reverse direction.

The parts as shown in Fig. 2 are in their proper positions when the scale is set to weigh its maximum load, namely all of the poise weights are on the poise and the weight cage is at its lowest point.

To weigh a load materially less than maximum the weight cage is elevated, thereby removing the poise weights, until a balance is obtained, as will be indicated by the pointer in front of the dial.

The parts heretofore described constitute in the main the general construction of scales of this nature which are now in use and the description following refers to my present invention.

As previously stated, the dial 2 is provided with characters 3 and apertures 4.

Mounted immediately behind the dial 2, by means of arm 34, suitably journalled to cross bar 35, Fig. 2, is an index dial 36, which is provided with a series of indices, 37, Fig. 4, arranged to read through the apertures 4 in such manner as to impart a different value to the characters 3 of the dial 2.

The arm 34 which carries the index dial 36, is provided with a pin 38, which is engaged by a slot in the lever 39 and this lever is fulcrumed as at 40, to any suitable, stationary part of the apparatus, as to the back face of the dial 2.

The lever 39 is preferably bent, as shown, and has a slot in the bent end, which engages a pin 41 on the upper end of a rod 42, which rod passes downward and is attached to and moves with the weight cage 22.

The index dial may be in the form of a ring, as shown in Fig. 4, or may extend to the center and have only a small aperture, as is shown in the dial of Fig. 3.

By referring to Fig. 3 it will be seen that the maximum weight which can be indicated by the pointer, with both main and index dials, in the position shown, is two hundred pounds, and that at every twenty pounds of the graduations an aperture 4 is provided.

It will also be seen that between the twenty and forty pound points the face of dial 2 has been broken away and the indices of the index dial 36 are shown, while at Fig. 4 enough of the index dial 36 is shown to disclose all of the different groups of indices used in connection with a dial reading to two hundred pounds.

The operation of the device is as follows:

Any load less than two hundred pounds placed upon the scale platform will be weighed at once by the pointer traveling around the dial and stopping at the proper point.

If a load of more than two hundred pounds be placed on the scale to be weighed, the pointer will travel just beyond the two hundred pound point and it will be necessary for the operator to press the push button 32, which, through its connections, will permit the weight cage (Fig. 2) to descend and deposit a weight on the poise.

In descending, the weight cage will partially turn the index dial to the left, when viewed from the front, and will change the index of the dial so that the dial will read from two to four hundred pounds, each aperture in the dial then showing the proper index to the character on the dial.

If the pointer still stands beyond the limit of the dial the operator again presses the button 32, thereby depositing a second weight on the poise and again changing the index so that the dial reads from four to six hundred pounds.

If the weight on the scale platform is between four and six hundred pounds the pointer will move backward over the dial and stop at the proper place, thus indicating the weight of the load in such manner that it can be read directly from the dial, without any calculation on the part of the operator and its consequent liability of error.

It will be seen from the above that by pressing the button 32 the operator deposits a weight on the poise which just balances a weight equal to the total reading of the dial and in so doing doubles the original weight value of the dial and repeats this result for every time the button is pressed.

It is to be further observed that while I have shown a dial reading from zero to two hundred pounds, any other range of reading may be employed without departing from the spirit of my invention, and also that while I have shown a weight cage for operating the index dial, any other suitable mechanism may be used to cause the index dial to partially rotate to properly index the characters of the main dial.

It is well known that owing to the comparatively small movement of the scale beam and the difficulty of accurately producing the racks and pinions which operate the pointers of scales of this class, and maintaining their accuracy, large spaces between the pound or other marks on the dial are required to obtain accuracy in weighing and also that owing to the increasing error due to large diameter dials, small diameters are required.

With my main and index dials all of the previous troubles in these scales are overcome, for the reason that I am enabled to use a comparatively small diameter of dial with large spacing, and by changing the value of all of the weight characters, through the medium of the index dial, am enabled to weigh loads up to any practical limit and this without the necessity of any addition or calculation on the part of the operator and by direct reading of the weight on the scale.

Having thus fully described my invention, I claim:

1. In a scale, a dial having graduations marked thereon and a series of circumferentially-spaced openings therein arranged adjacent the graduations, an indicating hand co-operating with the dial to indicate weights, a disc rotatably mounted behind said dial and bearing series of numerals arranged to be displayed serially through said openings, load-offsetting means connected and arranged to actuate the indicating hand, including a scale beam, a series of counterpoise weights arranged to be serially connected to said scale beam, means for normally supporting said weights independently of the scale beam, and means for moving said disc to increase the numerals shown through the openings in said dial as the counterpoise weights are connected to the scale beam.

2. In a scale, a dial having graduations marked thereon and a series of circumferentially-shaped openings therein arranged adjacent the graduations, an indicating hand co-operating with the dial to indicate weights, a disc rotatably mounted behind said dial and bearing series of numerals arranged to be displayed serially through said openings, load-offsetting means connected and arranged to actuate the indicating hand, including a scale beam, a series of counterpoise weights arranged to be serially connected to said scale beam, means for normally supporting said weights independently of the scale beam, and means including a link connecting the weight-supporting means with the disc for moving said disc to increase the numerals shown through the openings in said dial as the counterpoise weights are connected to the scale beam.

3. In a scale, a dial having graduations marked thereon and a series of circumferentially-spaced openings therein arranged adjacent the graduations, an indicating hand co-operating with the dial to indicate weights, a disc rotatably mounted behind said dial and bearing series of numerals arranged to be displayed serially through said openings, load-offsetting means connected and arranged to actuate the indicating hand, including a scale beam, a counterpoise pan suspended from the scale beam, a series of counterpoise weights arranged to be serially deposited upon said pan, means for normally supporting said weights independently of the scale beam, and means for moving said disc to increase the numerals shown through the openings in said dial as the counterpoise weights are connected to the scale beam.

4. In a scale, a dial having graduations marked thereon and a series of circumferentially-spaced openings therein arranged adjacent the graduations, an indicating hand co-operating with the dial to indicate weights, a disc rotatably mounted behind said dial and bearing series of numerals arranged to be displayed serially through said openings, load-offsetting means connected and arranged to actuate the indicating hand, including a scale beam, a pendulum counterbalance connected with the scale beam, a series of counterpoise weights arranged to be serially connected to said scale beam, means for normally supporting said weights independently of the scale beam, and means for moving said disc to increase the numerals also shown through the openings in said dial as the counterpoise weights are connected to the scale beam.

5. In a scale, a dial having graduations marked thereon and a series of circumferentially-spaced openings therein arranged adjacent the graduations, an indicating hand co-operating with the dial to indicate weights, a disc rotatably mounted behind said dial and bearing series of numerals arranged to be displayed serially through said openings, load-offsetting means connected and arranged to actuate the indicating hand, including a scale beam, a pendulum counterbalance connected with the scale beam, a series of counterpoise weights arranged to be serially connected to said scale beam, means for normally supporting said weights independently of the scale beam, and means including a link connecting the weight-supporting means with the disc for moving said disc to increase the numerals shown through the openings in said dial as the counterpoise weights are connected to the scale beam.

6. In a scale, a dial having graduations marked thereon and a series of circumferentially-spaced openings therein arranged adjacent the graduations, an indicating hand co-operating with the dial to indicate weights, a disc rotatably mounted behind said dial and bearing series of numerals arranged to be displayed serially through said openings, load-offsetting means connected and arranged to actuate the indicating hand, including a scale beam, a pendulum counterbalance connected with the scale beam, a counterpoise pan suspended from the scale beam, a series of counterpoise weights arranged to be serially deposited upon said pan, means for normally supporting said weights independently of the scale beam, and means for moving said disc to increase the numerals shown through the openings in said dial as the counterpoise weights are connected to the scale beam.

7. In a dial scale a circular dial provided with a set of weight indicating characters extending substantially around a periphery thereof, an indicator centrally mounted with respect to said dial and adapted to coact with the characters thereon to indicate a weight, balancing means having connection for operating said indicator, a second circular dial provided with a set of index characters adapted to coact with the characters on the first dial to indicate a weight, and means controlled by counterpoising for partially rotating said second dial thereby changing the indices of the weight indicating characters on the first mentioned dial.

8. In a dial scale a pointer, balancing means having connection for operating said pointer, a stationary circular dial adjacent said pointer and provided with apertures and weight indicating characters extending substantially around the periphery of said dial, a circular index dial rotatably mounted adjacent said first named dial and provided with index characters arranged in register with the apertures of the first mentioned dial, and means controlled by counterpoising for partially rotating said index dial.

9. In a dial scale a pointer movable through substantially a full circle, balancing means having connections for operating said pointer, a stationary circular dial adjacent said pointer and provided with apertures and weight indicating characters arranged substantially around the periphery of the dial, a movable circular index dial mounted axially coincident with said first named dial and carrying a set of index characters adapted to register with the apertures and cooperate with the weight indicating characters of said first named dial, and an auxiliary device controlled by counterpoising for operating said index dial when the weight to be weighed is greater than the primary reading of the stationary dial.

10. In a dial scale a dial frame, a stationary circular dial mounted therein and provided with a set of weight indicating characters and apertures arranged adjacent to and extending substantially around the periphery of said dial, an indicator journaled in axial alignment with the center of said dial, balancing means, a connection between said balancing means and said indicator, a circular index dial journaled in axial alignment with said first named dial and provided with index characters for the weight indicating characters thereof, and automatic means under control of said weighing means for varying the effect of a weight on said indicator and for moving said index dial.

11. In a dial scale, a main circular stationary dial carrying weight indicating characters, an auxiliary rotatable circular index dial carrying indices for the characters of said stationary dial, counterpoising means, and means controlled by the counterpoising means for rotating said index dial to change the reading of said main dial.

12. In dial scales a pointer, balancing means having connections for moving said pointer, a stationary circular dial provided with apertures and weight indicating characters arranged substantially around the periphery thereof and with which said pointer coacts to indicate a weight, a rotatable circular index dial mounted behind said main dial and provided with indices for the characters of said dial said indices being arranged to be read through said apertures and to co-operate with said weight indicating characters and said pointer to indicate a weight greater than the primary reading of said stationary dial, and means controlled by counterpoising for moving said index dial.

13. In a scale, the combination of a stationary dial with a plurality of series of figures forming a circle around the face of the dial, said dial having openings formed therein in a circle concentric with that of the series of figures, an indicator movable over the face of said dial and adapted to co-operate with the figures thereon, a movable dial behind said first mentioned dial and formed with a plurality of series of figures extending in a circle behind said first mentioned figures and adapted to register in succession with said openings, a counterpoise support, means connecting said support to said movable dial whereby said dial will move when said support moves, and means controlling the position of the indicator and controlled in turn by counterpoises transferred between said means and the support when the latter is moved.

14. In a scale, the combination of a stationary dial with figures thereon, a pointer and connections so arranged that the pointer will indicate upon the dial the load upon the scale, a movable dial having series of figures thereon in juxtaposition to the first mentioned figures, a movable cage and counterpoises supported thereon, connections between said movable dial and said movable cage, means for normally holding the dial and cage against movement, a pendant suspended from said pointer connections and located near said cage, whereby the cage when released will transfer a counterpoise to said pendant and the movable dial will move in unison with said cage to bring the proper figure adjacent a stationary figure substantially as specified.

15. In a scale, the combination of a stationary dial having sets of series of figures thereon, one set of said series being out of line with the other set the dial also having a plurality of windows or openings, each opening or window being adjacent to one of said figures, a movable dial arranged behind said first mentioned dial and having thereon sets of figures, one set comprising even numbers and the other set comprising odd numbers, and means for operating said movable dial to bring the same figure of all the series of even numbers and the same figure of all the series of odd numbers in register with the windows or openings of said stationary dial.

16. In a scale, the combination of a stationary dial having series of figures, the corresponding numbers in any two series differing by a multiple of twenty, said figures being arranged on the face of the dial adjacent its margin and the dial being formed with windows or openings adjacent to each figure denoting a multiple of twenty, a movable dial located rearwardly of the first mentioned dial and having around the face sets of a plurality of series of figures, one set of series comprising even numbers and the other set odd numbers, and means for moving the last mentioned dial whereby a plurality of like figures will appear within the said openings or windows of the stationary dial for the purpose specified.

17. In a scale the combination of a stationary dial having series of incomplete figures arranged on the face thereof and adjacent the margin and the dial being provided with means adjacent each incomplete figure whereby an index figure may be read therewith, a moveable dial having around the face a plurality of sets of figures adapted to be read with the figures of the first mentioned dial, and means for moving the last mentioned dial whereby a plurality of like figures will appear as indexes for the figures of the stationary dial.

18. In a scale, the combination of a fixed dial with figures thereon and a movable pointer adapted for connection to the moving parts of the scale so that the pointer will indicate upon said dial the weight of the load, a movable cage, a movable dial with figures in juxtaposition to said first mentioned figures, a pendant, counterpoises normally supported by said cage but adapted to be transferred to the pendant by movement of the cage, means connecting the cage with the movable dial and means connecting the pendant with said pointer, whereby a movement of the cage sufficient to transfer a counterpoise to the pendant will cause a corresponding movement of the movable dial to bring the proper figure on the movable dial adjacent to one of the figures on the stationary dial.

19. In a scale, the combination of an indicator having a stationary dial with a series of figures thereon and a revoluble dial having a series of figures adjacent the first mentioned figures, said stationary dial having windows adjacent the figures thereon, a plurality of supplemental counterbalances, means for moving said counterbalances, and means connecting said supplemental counterbalances with the revoluble dial whereby a plurality of figures indicating the amount of said counterbalance will appear through said windows for the purpose specified.

HERMAN DE WITT RIDGE.